United States Patent [19]

Tajima et al.

[11] Patent Number: 4,644,497

[45] Date of Patent: Feb. 17, 1987

[54] SERIAL KEYBOARD INTERFACE SYSTEM WITH FRAME RETRANSMISSION AFTER NON-TIMELY ACKNOWLEDGEMENTS FROM DATA PROCESSOR

[75] Inventors: Satoshi Tajima; Shinpei Watanabe, both of Kanagawa, Japan

[73] Assignee: International Business Machines Corp., Armonk, N.Y.

[21] Appl. No.: 559,559

[22] Filed: Dec. 8, 1983

[30] Foreign Application Priority Data

Dec. 28, 1982 [JP] Japan .................................. 57-227846

[51] Int. Cl.⁴ ........................ G06F 15/02; G06F 3/02; G06F 3/023; G06F 11/00
[52] U.S. Cl. ..................................... 364/900; 371/32; 371/61; 340/365 S; 340/365 E
[58] Field of Search ... 364/200 MS File, 900 MS File, 364/518; 371/22, 61, 32–34; 340/365 S, 365 R, 365 E

[56] References Cited

U.S. PATENT DOCUMENTS

| | | | |
|---|---|---|---|
| 4,200,913 | 4/1980 | Kuhar et al. | 364/900 |
| 4,271,479 | 6/1981 | Cheselka et al. | 364/900 |
| 4,354,252 | 10/1982 | Lamb et al. | 364/900 |
| 4,392,197 | 7/1983 | Couper et al. | 364/200 |
| 4,460,957 | 7/1984 | Eggebrecht et al. | 364/200 |
| 4,482,955 | 11/1984 | Amano et al. | 364/200 |
| 4,523,297 | 6/1985 | Ugon | 364/900 |
| 4,523,298 | 6/1985 | Sakurai | 364/900 |
| 4,527,250 | 7/1985 | Galdun | 364/900 |
| 4,532,416 | 7/1985 | Berstein | 235/379 |
| 4,536,647 | 8/1985 | Atalla et al. | 235/379 |

*Primary Examiner*—Archie E. William
*Attorney, Agent, or Firm*—John B. Frisone

[57] ABSTRACT

A keyboard interface for a data processing system in which a keyboard and a data processor unit are connected through a single clock line for transmitting a clock signal from the keyboard and a single data line for transmitting a serial bit frame having a serial scan code identifying a depressed key in synchronism with the clock signal. The interface uses an error detection and retransmission procedure to correct errors due to noise pulses which are induced on the clock line as by electrostatic discharge and give rise to extra data sampling. The data processing system returns a status signal acknowledging the receipt of a frame to the keyboard via the data line immediately after the number of sampled bits received reaches the predetermined number of bits of a frame. The keyboard checks whether the status signal has been returned after the completion of transmission of a frame and, if not, the same serial scan code is retransmitted.

1 Claim, 7 Drawing Figures

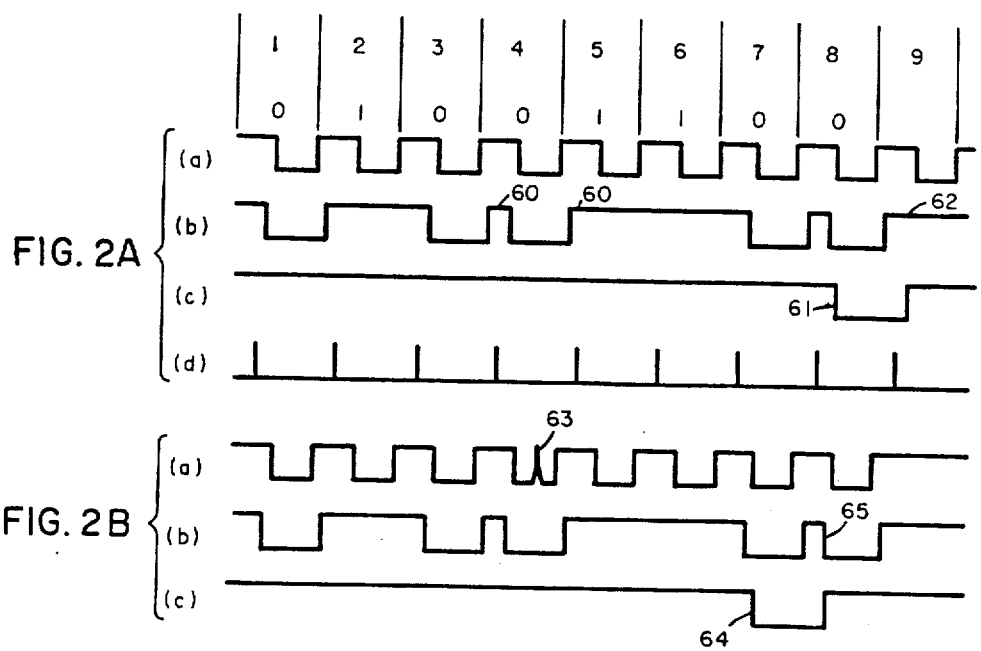
FIG. 2A
FIG. 2B
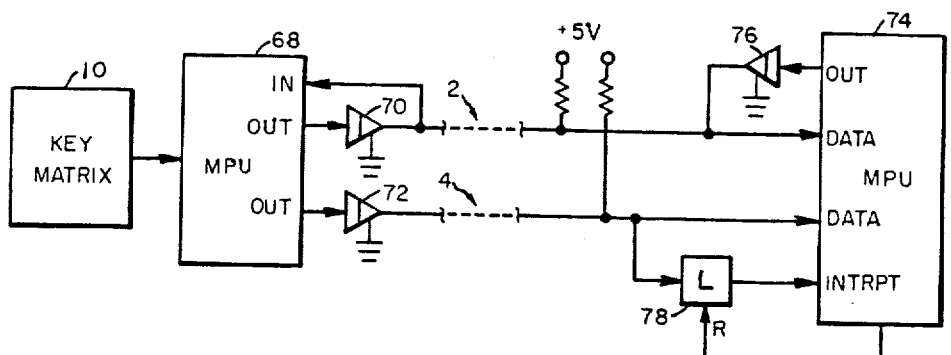
FIG. 3

SERIAL KEYBOARD INTERFACE SYSTEM WITH FRAME RETRANSMISSION AFTER NON-TIMELY ACKNOWLEDGEMENTS FROM DATA PROCESSOR

BACKGROUND OF THE INVENTION a. Field of the Invention

This invention relates to a keyboard interface, and more particularly, to a serial keyboard interface system to prevent the erroneous transmission of keyboard data due to noise.

b. Background Art

There has been proposed a keyboard system in which a keyboard and a data processing unit are connected through a data line and a clock line so as to transmit keyboard out codes bit-serially through the data line and to transmit a keyboard out clock signal through the clock line. The keyboard out codes are transmitted in a 9-bit frame consisting of a leading start bit and the following 8-bit serial scan code identifying a key position. On the data processing unit side, there is provided a 9-stage serial-parallel shift register connected to the data line and clock line. The bits of the frame received are loaded successively from lowest order or least significant stage of the serial-parallel shift register under the control of the clock signal. The completion of the receipt of the 9-bit frame is indicated when the start bit appears at the highest order or most significant stage.

The start bit from the highest order stage causes an interruption to request the read-in of the scan code located in the shift register into the data processing unit, and also signals to the keyboard that additional keyboard data cannot be sent until the read-in process is completed.

This keyboard system is very simple because the keyboard data can be sent by the use of a single data line and a single clock line, and further the keyboard has the advantage of being operated at the pace of its own clock independently of the clock of the data processing unit.

It was found, however, that this keyboard causes false operation due to noise when a low cost stretch cable without shield is used as a cable for connecting the keyboard with the data processing unit. Static discharge typical of external disturbance introduces noise pulses on the cable. The noise pulse may be induced on either or both the data and clock lines. When the data signal is sampled in response to the transitions of the clock signal for loading into the shift register, a bit error may be caused if the noise pulse on the data line is sampled. However, this bit error may be detected, for example, by parity check.

On the other hand, when the noise pulse is induced on the clock line, the same data bit is sampled twice by the normal clock signal and the noise pulse. This leads to false receipt of 9 bits of a frame by the serial-parallel shift register before the 9-bit transmission from the keyboard is completed, resulting in dropout of the 9th bit. Since the number of binary 1's is unchanged when the last bit dropped out is binary 0 and the data bit sampled twice is binary 0 and when the last bit is binary 1 and the data bit sampled twice is binary 1, this data error cannot be detected by parity check. The data error is also caused when clock pulses are counted in response to the transitions of the clock signal until a predetermined number of bits of a frame is reached, which indicates the end of a frame. In this case, counting is made twice in one clock cycle due to noise, causing similar erroneous transmission.

Although such data error due to noise pulses may be prevented by the use of a shielded cable, such a cable is very expensive and it is desired to prevent such data error when a low cost cable without shield is used.

SUMMARY OF THE INVENTION

One object of the present invention is to provide a serial keyboard interface system for a data processing system of the type in which a keyboard and a data processing unit are connected through a clock line and a data line for transmitting keyboard data serially, which solves the problem of erroneous transmission of keyboard data due to noise pulses induced in the clock line.

In accordance with the serial keyboard interface system of the present invention, check is made between the keyboard and the data processing unit as to whether or not the data are correctly transmitted to the data processing unit side. On the data processing unit side, a count is made in response to the clock signal, and when the number equal to a predetermined number of bits of a frame is counted, a status signal indicating the receipt of the keyboard data bits of a frame is returned to the keyboard. This status signal is transmitted through the data line. On the keyboard side, a check is made as to whether or not the status signal is returned after the transmission of data bits of a frame is completed, and when the status signal is received before the completion of transmission, a negative response signal is transmitted to the data processing unit, and when the status signal is received after the completion of transmission a positive response signal is transmitted. These response signals may be transmitted through the data line. In case of a negative response, the data previously received is discarded in the data processing unit, and the keyboard retransmits the same keyboard data. The present invention may be implemented either with dedicated hardware or microcomputers.

BRIEF DESCRIPTION OF THE DRAWINGS

FIGS. 2A and 2B show the waveforms of the operation.

FIG. 3 shows the second embodiment of the present invention using microprocessors.

DETAILED DESCRIPTION OF THE INVENTION

Figure 1:
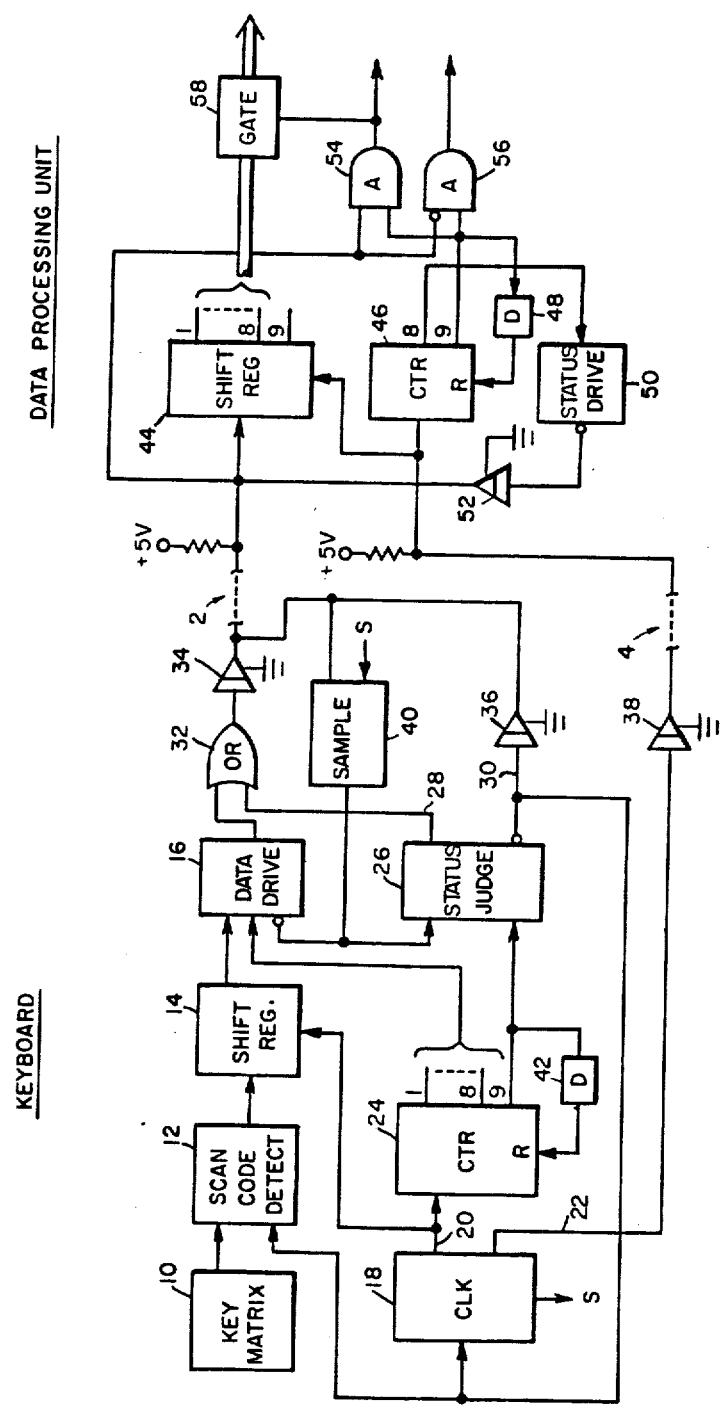
FIG. 1 shows the first embodiment of the present invention implemented by hardware, configured to supply the positive/negative response to the data line.

Referring to the drawings, the preferred embodiment of the present invention will be described. FIG. 1 shows the configuration of a first embodiment implemented by hardware. The left side of FIG. 1 shows the keyboard side, and the right side shows the data processing unit side. The keyboard and the data processing unit are connected together by a data line 2 and a clock line 4. The depression of a key in a key matrix 10 is detected by a key scan code detection circuit 12, and the 8-bit scan code identifying the key depressed is held in a code register in the key scan code detection circuit 12, then loaded into the serial-parallel shift register 14. A clock circuit 18 generates 9 clock pulses on a line 20 each time a scan code is transmitted. The shift register 14 shifts out the 8-bit scan code serially to a data drive circuit 16 in response to the clock pulses on the line 20. A counter 24 counts 9 clock pulses on the line 20. The count outputs 1-8 are sent to the data drive circuit 16. The count 9 output is applied to a status judge circuit 26.

The status judge circuit 26 receives the output of a sample circuit 40 as another input. The sample circuit 40 receives the data line 2 as an input, and receives sample pulses S as another input, which are produced by the clock circuit 18 in each clock cycle at a predetermined timing. The data processing unit applies to the data line 2 a low level status signal indicating the completion of receipt of the keyboard data of a frame when the keyboard data of a frame is received. The sample circuit 40 checks at each sample time if the status signal is supplied to the data line 2 from the data processing unit, and produces a high level output when the status signal is detected.

The status judge circuit 26 is responsive to the count 9 output of the counter 24 and the output of the sample circuit 40 to judge if the status signal is detected in the period of the count 9. The status judge circuit 26 produces a high level output indicative of positive response on the line 28 when the status signal is detected in the period of the count 9, and when the status signal is not detected in the period of the count 9, it produces a low level signal indicative of negative response on the line 30.

The output of the sample circuit 40 is applied to the data drive circuit 16. The data drive circuit 16 receives the serial 8-bit scan code from the shift register 14, the count outputs 1-8 of the counter 24 and the output of the sample circuit 40, and on condition that the output of the sample circuit 40 is low, i.e., the status signal is not detected, the data drive circuit 16 sends the 8-bit data of the scan code serially in synchronism with the count outputs 1-8. The output of the data drive circuit 16 drives an open collector gate 34 through an OR circuit 32. The data line 2 is connected to +5 V power supply and is normally at high level. The open collector gate 34 acts to maintain the high level of the data line 2 when the input (the output of the OR circuit 32) is high, and to lower the level of the data line to low level (typically earth level) when the input is low. For example, such an open collector gate is shown as SN 7407 in Texas Instruments' "The TTL Data Book," second edition, 1976. Thus, the data drive circuit 16 outputs scan code bits to the data line 2 until the status signal is detected by the sample circuit 40. In this example, it is assumed that the keyboard data of a frame contains only an 8-bit scan code.

On the other hand, the clock circuit 18 generates 9 clock pulses on a line 22 each time a scan code is transmitted, and drives the clock line 4 through an open collector gate 38. The clock line 4 is also connected to +5 V power supply, and is normally at high level. The clock signal on the line 22 has the same frequency as that of the clock signal on the line 20 but is delayed by a predetermined time from the clock signal on the line 20 so that the data signal on the data line 2 and the clock signal on the clock line 4 are in a predetermined phase relationship.

On the data processing unit side, the serial data bits are loaded into a 9-stage serial-parallel shift register 44 by the clock signal on the clock line 4, and clock pulses are counted by the counter 46. When the count reaches 8, which shows the completion of receipt of the 8-bit scan code of a frame, a status drive circuit 50 produces a low level in response to the count 8 output of the counter 46, and drives the data line 2 to low level through an open collector gate 52. This low level of the data line 2 is the status signal indicative of the completion of receipt of a frame.

The status signal is detected by the sample circuit 40, and supplied to the status judge circuit 26. The status judge circuit 26 produces a high level output on the line 28 when the status signal is detected in the period of count 9 of the counter 24, drives the data line 2 to high level through the OR circuit 32 and the open collector gate 34, providing a positive response signal. The status judge circuit 26 produces a low level output on the line 30 when the status signal is not detected in the period of count 9, and drives the data line 2 to low level through the open collector gate 36, providing a negative response signal.

The count 9 output of the counter 46 is applied to one input of the AND circuits 54 and 56, and the data line 2 is connected to another input of the AND circuits 54 and 56. The AND circuit 54 produces an output when the level of the data line 2 is high at count 9, i.e., positive response, indicating correctly received signals. The output of the AND circuit 54 activates the gate circuit 58 to gate the bits 1-8 of the serial-parallel register 44 to other processing parts in the data processing unit. The AND circuit 56 produces an output when the level of the data line is low at count 9, i.e., negative response, indicating incorrectly received signals. The output of the AND circuit, if required, may be used to signal "stand by" to other processing parts.

The low level negative response signal on the line 30 from the status judge circuit 26 is sent to the clock circuit 18 and the key scan code detection circuit 12 to initialize these circuits, and commands the retransmission of the same keyboard data in the code register of the circuit 12. The counters 24 and 46 are reset by their count 9 outputs passing through the delay circuits 42 and 48, respectively.

Next, referring to waveforms in FIG. 2 illustrating operational examples of the present invention, the operation of the keyboard interface system of FIG. 1 will be described. FIG. 2A shows correct data transmission and FIG. 2B shows erroneous data transmission. First, in FIG. 2A, the waveform (a) shows the clock signal to the clock line 4 from the clock circuit 18 through the line 22 and the open collector gate 38. In the example, the high and low level periods of the clock signal are 100 μs, respectively. The waveform (b) shows the data signal to the data line 2 from the keyboard. The waveform (c) shows the status signal to the data line 2 from the data processing unit side. In FIG. 2A, although waveforms (b) and (c) are separately shown for convenience, the voltage level of the data line is actually a logical AND of waveforms (b) and (c). The numbers 1-7 at the uppermost row show the clock cycles, and data of a frame ends at the cycle 8 and the cycle 9 is used for status detection/response.

In the keyboard, the data line 2 is sampled in the sample circuit 40 by the sample pulse S from the clock circuit 18 for each clock cycle and the presence of the status signal is checked. The waveform (d) shows the sampling time by the sample pulses S. The status signal is of low level, and in order to enable the detection of the status signal of low level, it is required for the keyboard to make the level of the data line high at the sampling time. Therefore, the data signal is, as indicated by the reference number 60, driven to a high level for a predetermined period including the sampling time regardless of the value of data bit.

The transitions of the clock signal (a) to low level are counted with the counter 46. Also, the data signal (b) is sampled at the transitions of the clock signal (a) to low level, and is loaded into the shift register 44. Therefore, it is required for the data signal to have a significant data level at the time of the transitions of the clock signal (a) to low level. Therefore, the signal (a) is delayed from the clock signal on the line 20 so as to provide this phase relation.

At the keyboard, the data line is sampled at each clock cycle, and since the status signal is not detected before cycle 7, the keyboard continues to send serial data bits. At cycle 8, the counter 46 produces count 8 output and makes the data line level low as seen at 61 of the waveform (c), thereby returning to the keyboard the status signal indicative of the completion of receiving of a frame.

Since the sampling circuit 40 detects the low level of the status signal at the sampling of cycle 9 and this time the counter 24 counts 9, the status judge circuit 26 drives the data line through the line 28 to high level (62 of the waveform b), thereby returning the positive response signal to the data processing unit.

The counter 46 of the data processing unit produces count 9 output at the negative-going transition of the clock pulse of cycle 9, when the AND circuit 54 produces an output in response to the positive response signal and count 9.

FIG. 2B shows the case where erroneous transmission is caused by noise pulse 63. During clock cycle 4, the shift register 44 of the data processing unit samples the data bit 0 twice at the negative-going transitions of the clock pulse and the noise pulse 63, and takes in the same data twice. Therefore, data error is caused. Since the counter 46 also counts twice at the negative-going transitions of the clock pulse of clock cycle 4 and the noise pulse 63, the counter 46 produces count 8 output at clock cycle 7, and the status signal is produced at clock cycle 7, see 64 of the waveform (c).

On the keyboard, the status signal is detected at the sampling of clock cycle 8. At this time, since the counter 24 does not produce count 9 output, the status judge circuit 26 drives the data line through the line 30 to low level (65 of the waveform b), thereby providing the negative response signal.

At the data processing unit, the counter 46 produces count 9 output at the clock pulse of clock cycle 8, and the AND circuit 56 produces an output.

The negative response signal from the status judge circuit 26 is transferred to the clock circuit 18 and the key scan code detection circuit 12 to control them to retransmit the keyboard data.

The duration of the noise pulse due to static discharge is on the order of 10-100 ns, and experience shows that noise pulses are produced at time intervals of at least 10 ms. These intervals are considerably longer than the time required for (the transmission of a frame) plus (status detection/response/retransmission) when a clock cycle is 200 μs as in this example, and it was found that it is rarely that erroneous transmission is again detected in retransmission and that retransmission is not repeated. Since the intervals of noise pulses may change depending on circumstances, the clock frequency should be chosen according to the possible intervals of noise pulses.

The functions described above such as keyboard data transmission, the return of status information, the detection of status information, positive/negative response and retransmission can be implemented with a microcoded microprocessor. FIG. 3 shows such an embodiment of the present invention. The keyboard comprises a key matrix 10, a microprocessor 68, open collector gates 70 and 72, while the data processing unit comprises a microprocessor 74, an open collector gate 76 and an interruption latch 78. The gate 70 corresponds to the open collector gates 34 and 36 in FIG. 1, the gate 72 corresponds to the open collector gate 38 in FIG. 1, and the gate 76 corresponds to the gate 52 in FIG. 1. Therefore, all other functional means of the keyboard in FIG. 1 than the key matrix 10, and gates 34, 36 and 38 are performed by the microprocessor 68. Functional means of the data processing unit in FIG. 1 other than the gate 52 are performed by the microprocessor 74 and the interruption latch 78.

The microprocessor 68 is a microprocessor such as Intel 8048, and constitutes a self-scan serial keyboard together with the key matrix 10. The microprocessor 74 is a microprocessor such as Motorola 6800. Functions performed by the microprocessors 68 and 74 correspond to functions described above relating to FIGS. 1 and 2. A feature in operation based on the use of program control is the use of interruption. In FIG. 1, data bits are automatically taken in the serial-parallel register 44 in response to the negative-going transitions of the clock signal, and the negative-going transitions of the clock signal are counted with the counter 46. On the other hand, in the example of FIG. 3, the keyboard interruption request is issued to the microprocessor 74 by the latch 78 set based on the negative-going transition of the clock signal, and by this interruption, the data signal sampling and bit counting are initiated. At the end of operations such as data sampling and bit counting, the latch 78 is reset, and the microprocessor 74 returns to the data processing before the interruption, and continues the data processing until the keyboard interruption request is issued again by the low level of the clock signal at the next clock cycle.

Figure 4A:
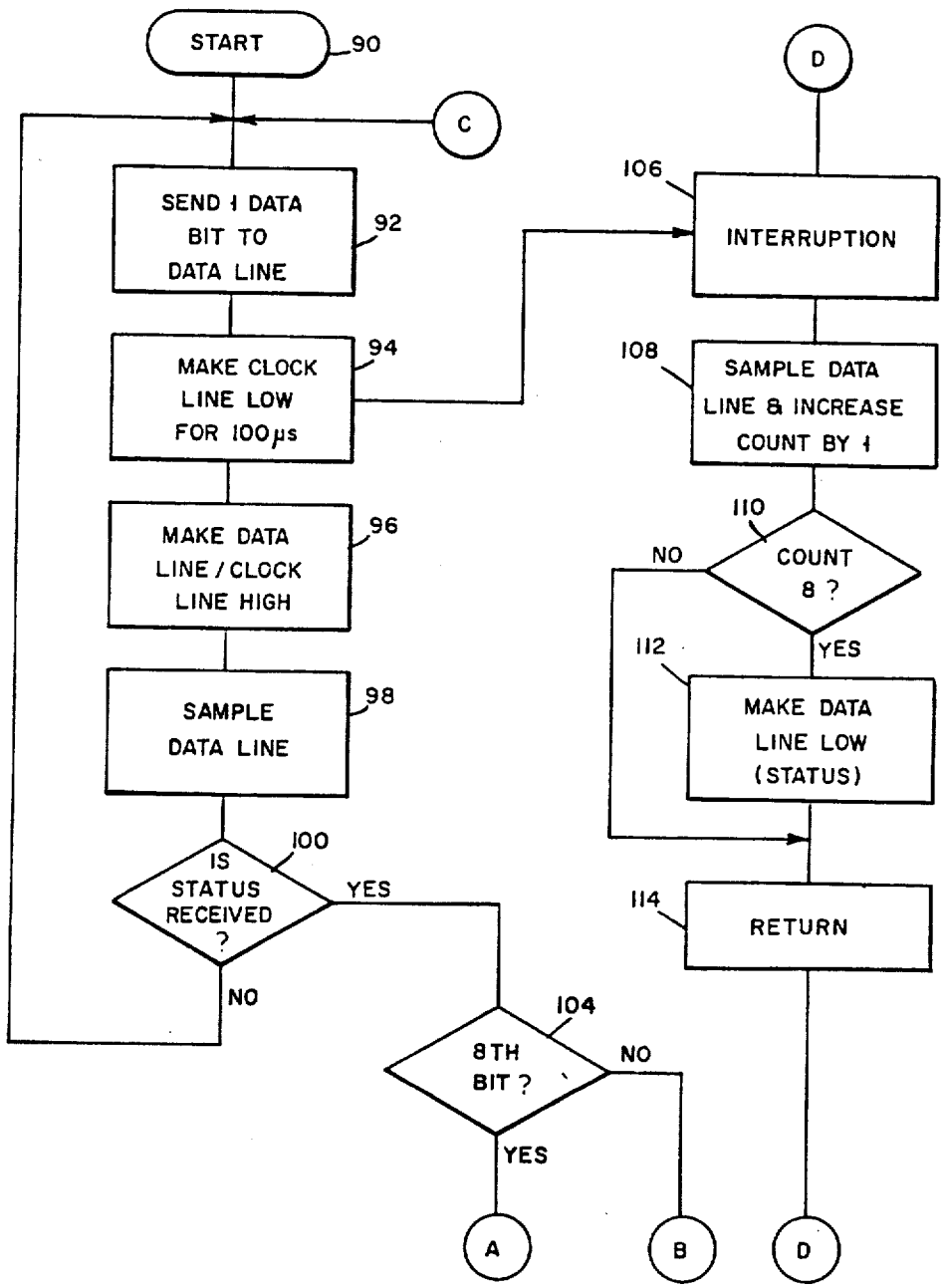
FIGS. 4A through 4C show the control program flowchart of the microprocessors of FIG. 3 when the positive/negative response is supplied to the data line.
Figure 4B:
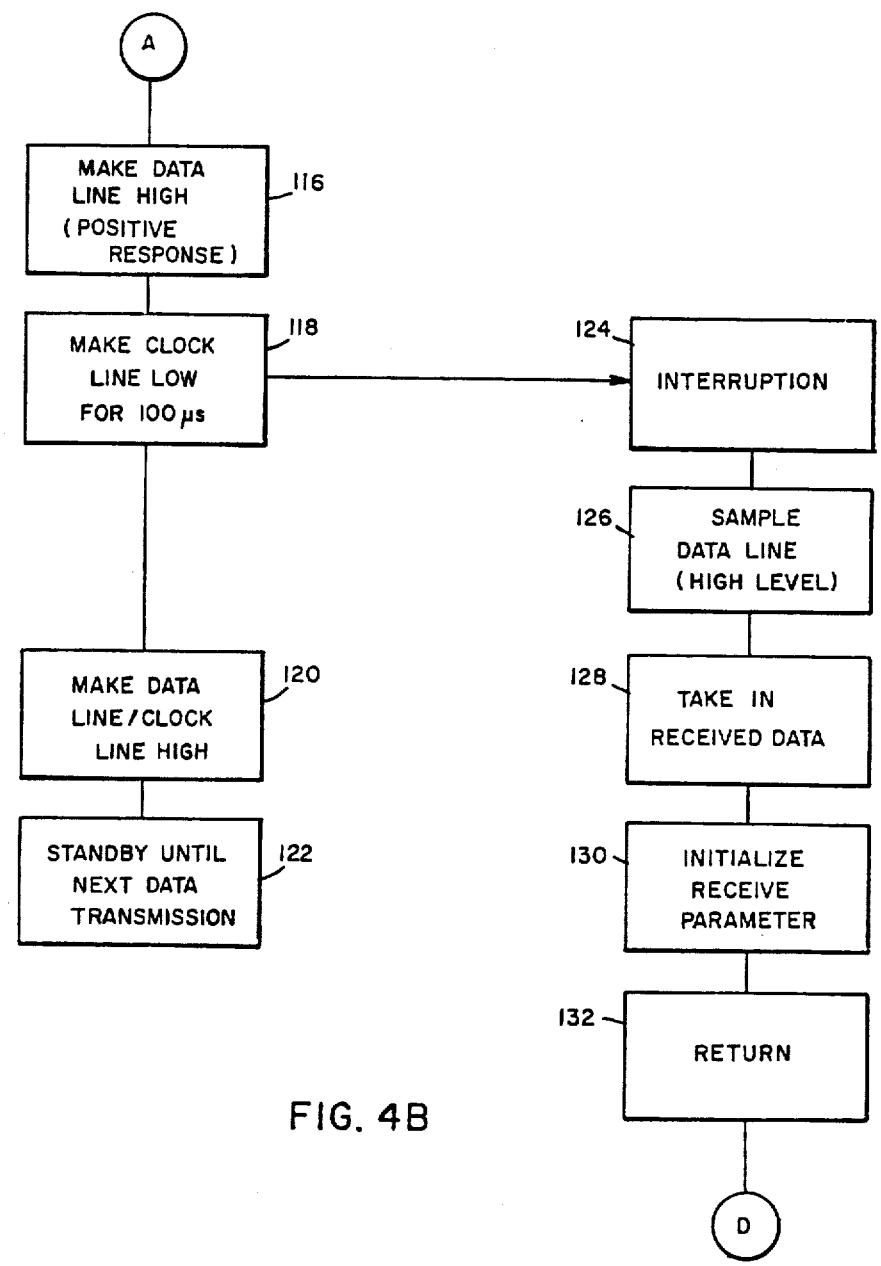
Figure 4C:
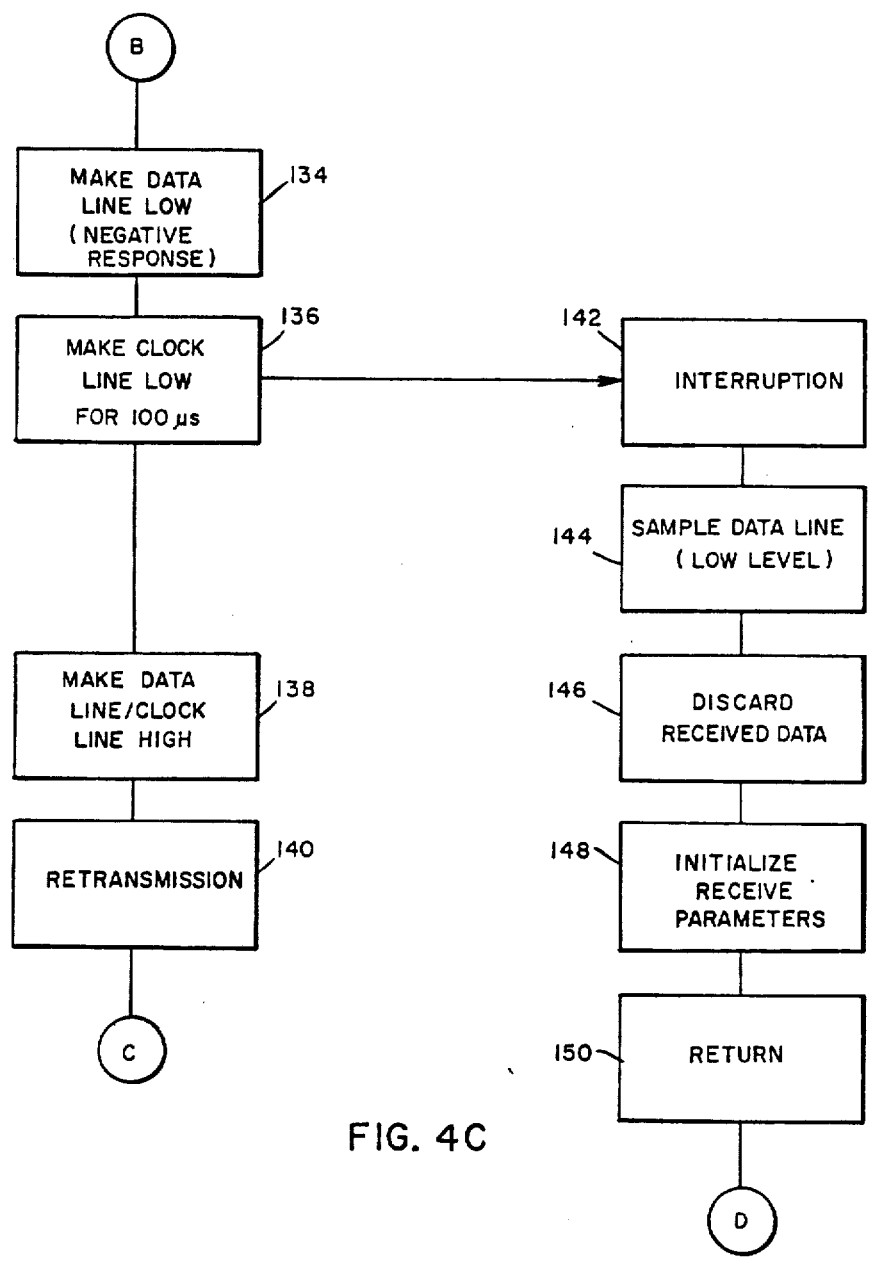

FIGS. 4A, 4B and 4C are a flowchart of the control program for performing the above functions in the system of FIG. 3. On the keyboard side, the operation is started at step 90, and the first bit of the keyboard data of a frame is applied to the data line 2 at step 92. This corresponds to the negative-going transition in clock cycle 1 of the waveform (b) in FIG. 2A. At step 94, the level of the clock line 4 is made low for 100 μs. This corresponds to the low level in clock cycle 1 of the waveform (a) in FIG. 2A. At step 96, the data line and the clock line are made high. The clock line is made high at the end of each clock cycle. Also, to enable data line sampling for the status signal, the data line needs to be made high in the first half of each clock cycle regardless of the value of data bit. At step 98, the data line is sampled. At step 100, a check is made as to whether the status signal is detected as the result of sampling.

If the status signal is not detected at step 100, the program returns to step 92 and the operation is repeated. This corresponds to the transmission of data bits based on count outputs 1-8 of the counter 24 in FIG. 1 unless the status signal is detected in the sampling circuit 40. If the status signal is detected at step 100, the program proceeds to step 104 where a check is made as to whether the status signal is detected as the result of the transmission of the 8th data bit. If YES, the program proceeds to Ⓐ (FIG. 4B), and if NO, the program proceeds to Ⓑ (FIG. 4C).

On the other hand, at the data processing unit, the latch 78 is set by the negative-going transition of the clock line at step 94 to issue a keyboard interruption request. By this, the data line 2 is immediately sampled early in the low level period of the clock signal, and the count of the received data bit is increased by 1. At step 110, whether the data bit count is 8 is checked. If the count is not 8, the program proceeds to step 114, and the program return operation is performed. That is, the microprocessor 74 returns to the program processing before the interruption and continues the processing until the next keyboard interruption. If count=8 is detected at step 110, the program proceeds to step 112 to make the data line low to send the status signal, then proceeds to the return operation of step 114.

If the status signal is detected after the transmission of the 8th bit, the program proceeds from step 104 to FIG. 4B, and the keyboard drives the data line to high level at step 116, providing the positive response signal (62 of the waveform b on FIG. 2A). Then, the level of the clock line is made low for 100 μs.

In the data processing unit, keyboard interruption is produced at step 124 by the low level of the clock line at step 118, and the data line is sampled at step 126. Since the high level is detected at this time, showing correct receiving, the received scan code is taken in at step 128, the receiving parameters are initialized in preparation for receiving of the next keyboard data at step 130, and the return operation is entered at step 132.

The keyboard makes the clock line level high after 100 μs of the low level period and makes the data line high at step 120, and waits until the transmission of the next keyboard data at step 122.

When a noise pulse is produced on the clock line, interruption is caused also by the noise pulse, and data sampling and bit counting are performed twice for the same bit. Therefore, before the keyboard transmits the 8th bit, the bit count becomes 8 in the data processing unit. In this case, therefore, the answer to step 104 on FIG. 4A becomes NO and the program proceeds to FIG. 4C.

The keyboard drives the data line to low level at step 134, providing a negative response signal (65 of the waveform b on FIG. 2B). Next, the level of the clock line is made low for 100 μs at step 136.

The data processing unit produces interruption at step 142 by the low level of the clock line at step 136, and samples the data line at step 144. Since the low level is detected at this time, it shows incorrect receiving, the received scan code is discarded at step 146, the receiving parameters are initialized in preparation for retransmission at step 148, and the return operation is started at step 150.

The keyboard makes the clock line level high after 100 μs of the low level period at step 138 and makes the data line level high, and starts retransmission at step 140.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. In a data processing system wherein a keyboard and a data processing unit are connected through a clock line for transmitting keyboard clock signals and a data line for transmitting a serial scan code identifying a depressed key, said scan code being transmitted in a frame including a predetermined number of bits transmitted in series and each bit in synchronism with a one of said clock signals, a serial keyboard interface system, comprising:

a data processing unit including:
counting means responsive to said clock signal received from said clock line to advance its count,
first means responsive to said counting means reaching a predetermined count for applying to said data line a status signal indicating the receipt of the bits of a frame, a keyboard including;
second means for generating and applying a negative response signal to said data line when said status signal is received before all the bits of a frame have been transmitted from said keyboard via said data line, and
third means responsive to said negative response signal to effect retransmission of the same scan code which caused the negative response signal.

* * * * *